United States Patent [19]

Acuff

[11] 4,003,597
[45] Jan. 18, 1977

[54] VEHICLE SUN BLINDNESS ELIMINATOR

[76] Inventor: Jerry Doyal Acuff, 11741 Saticoy, No. 18, North Hollywood, Calif. 91605

[22] Filed: Aug. 25, 1975

[21] Appl. No.: 607,668

[52] U.S. Cl. .............................. 296/97 C; 248/285
[51] Int. Cl.² .......................................... B60J 3/00
[58] Field of Search ............ 296/97 R, 97 B, 97 C, 296/97 F; 248/285, 286

[56] References Cited

UNITED STATES PATENTS

| 1,275,974 | 8/1918 | Mosher | 296/97 C |
| 2,135,145 | 11/1938 | Reed | 248/286 |
| 2,894,576 | 7/1959 | Williams | 296/97 C |
| 3,499,679 | 3/1970 | Olander | 248/286 |
| 3,639,481 | 2/1972 | Innes | 296/92 F |
| 3,868,293 | 2/1975 | Selph | 296/97 F |
| 3,877,745 | 4/1975 | Girard | 296/97 C |

Primary Examiner—Philip Goodman
Assistant Examiner—John A. Carroll
Attorney, Agent, or Firm—Marden S. Gordon

[57] ABSTRACT

An accessory for vehicles to eliminate sun blindness in those areas not protected by the conventional sun visor, the eliminator consisting of a translucid or transparent disc colored to shield the sun's rays while permitting visibility therethrough, the disc supported at one end of a telescopic rod having its opposite end secured to a swivel base with the base having pressure sensitive adhesive on the bottom surface thereof for ready application to the conventional sun visor to serve as an accessory thereto.

1 Claim, 3 Drawing Figures

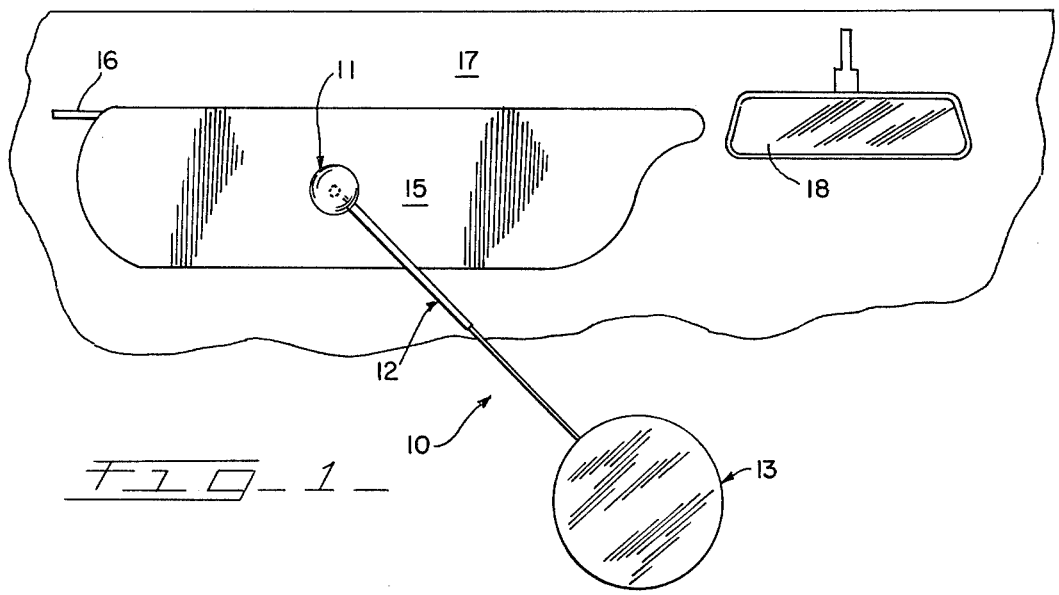
FIG-1-
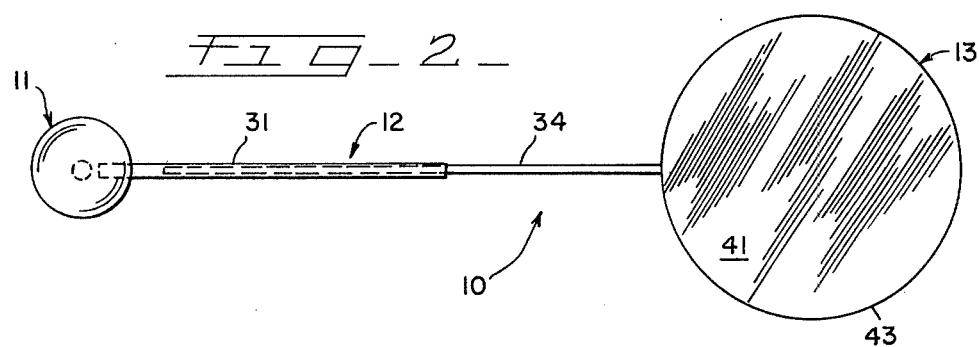
FIG-2-
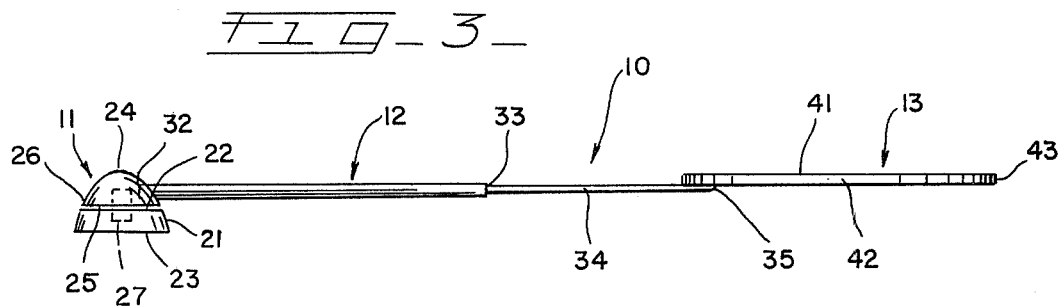
FIG-3-

VEHICLE SUN BLINDNESS ELIMINATOR

BACKGROUND OF THE INVENTION

1. Field of the Invention

This invention relates generally to vehicle accessories and more particularly too a novel and improved vehicle sun blindness eliminator intended to protect a vehicle driver or passenger from the sun's rays in those areas not protected by the conventional sun visor.

2. Description of the Prior Art

Conditions proving hazardous to drivers are quite dangerous in vehicles in view of the possible personal and property damage and injury that can occur due to such conditions. One of the primary hazardous conditions which is experienced during sun-up and sun-down times of the day is that of poor visibility generated from the glare of sunlight shining directly into the eyes of the vehicle driver and thus affecting his vision. While conventional sun visors are provided as standard equipment on vehicles, they do not offer full protection as those areas when the sun is low in the sky are not shielded from the driver with the driver thus being forced to squint his eyes and drive with the best visibility he can obtain.

SUMMARY OF THE INVENTION

The present invention recognizes the hazardous conditions of sun glare to a vehicle driver, and recognizing that conventional sun visors cannot prevent all of such glare conitions, provides a novel solution thereto in the form of an accessory sun blindness eliminator intended to be mounted on the conventional sun visor and including a translucent or transparent disc which is readily movable on a swivel base by the vehicle driver in order to block the glare of the sun's rays and thus permits the driver to view the road without any hinder from the sun's rays.

The provision of a vehicle sun blindness eliminator for vehicles, such as briefly outlined above, and possessing the stated advantages, consititues the principle features of the present invention. The provision of a sun blindness eliminator which is relatively simple in its construction such that it may be readily manufactured at a low cost to be retailed accordingly at a low cost to encourage widespread purchase thereof; one which is rugged and durable and which, therefore, may be guaranteed by the manufacturer to withstand intended usage; one which is easy to use and reliable and efficient in operation; and one which may, in its entirety, be maufactured and installed as part of the original equipment of the vehicle, or which may be readily attached to the vehicle later without any special tools or expertise as an accessory item.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a view of the vehicle sun blindness eliminator of the present invention as mounted to a conventional sun visor within a vehicle;

FIG. 2 is a top plan view of the sun blindness eliminator of the invention; and

FIG. 3 is a side elevational view of the sun blindness eliminator of the invention.

DESCRIPTION OF THE PREFERRED EMBODIMENT

Referring now to the drawings in detail, there is illustrated a preferred form of a vehicle sun blindness eliminator device constructed in accordance with the principles of the present invention and designated generally in its entirety by the reference numeral 10, the device comprised of three component parts, namely, a swivel base 11, a telescopic support rod 12, and a circular disc 13.

The swivel base 11 consists of two parts, namely, a mounting platform member 21 having flat top surface 22 and flat bottom surface 23, and a semi-spherical member 24 having flat bottom surface 25 and concave shaped outer surface 26. A shaft 27 extends between members 24 and 21 and is received in axially aligned sockets opening out of surfaces 22 and 25 for rotatively mounting member 24 to member 21. Bottom surface 23 is provided with pressure sensitive adhesive readily securing base 11 to conventional sun visor 15 supported by conventional shaft 16 inwardly of a conventional windshield 17 and mounted adjacent a conventional vehicle rear view mirror 18.

The telescopic rod 12 consists of a first elongated hollow open ended cylindrical member 31 having inner end 32 mounted in member 24 with body member 31 extending radially outwardly therefrom parallel to the plane of surface 25 and terminating in outer end 33. Solid cylindrical rod member 34 is telescopically received at its inner end through outer end 33 and terminates at its outer end at end 35.

The disc 13 is of a circular configuration having face surface 41, back surface 42, and peripheral circular side edges 43, the disc being joined to terminal end 35 of rod 34 in a manner such that rod 34 projects radially outwardly from the disc. The disc 41 may be manufactured of translucent or transparent or opaque material such as polystyrene, plexiglass, mylar, and the like with the material being colored or polarized to offer optinum light protection against the glare of the sun passing through windshield 17.

In operation, base 11 is affixed to sun visor 15 by means of pressure sensitive adhesive 23, with the vehicle driver ripping disc 13 and placing it in any desired position between his vision and the windshield by adjusting the same through use of swivel base 11 and telescopic rod 12 to provide protection against sunlight glare. An example would be during morning and evening rush hour traffic when the sun is in the lower portion of the sky, with the disc being utilized to filter the sun glare in those areas below the conventional sun visor 15 without blocking the view of the driver of the vehicle who is able to peer through the disc 13 to view the roadway ahead.

It is to be understood that the form of this invention as shown and described is to be taken as a preferred example of the invention, and that the invention is not limited to the specific arrangement of parts shown in the drawings or described in this description as various changes in the details of construction as to size, arrangement and shape of parts may be resorted to without departing from the scope of the novel concepts of the invention.

Having thus described the invention, what is claimed is:

1. A vehicle sun blindness eliminator device comprising, in combination:

a swivel base adapted to be affixed to a conventional sun visor of a vehicle, a telescopic support rod having one end affixed to the swivel base with the rod extending radially outwardly therefrom, a flat circular disc manufactured of translucid or translucent material and affixed to the opposite end of the support rod, the swivel base consisting of a platform having a flat bottom surface and a flat top surface, a swivel member having a flat bottom surface and a curved exterior top surface, a shaft extending normal to the platform top surface and projecting outwardly from the central portion thereof, a socket defined centrally of said swivel member bottom surface for receiving the shaft therein when the swivel member bottom surface is disposed parallel to the platform top surface and spaced slightly therefrom, the telescopic rod comprising a first member and a second member, the first member being of an elongated hollow open ended cylindrical tube having one end secured to the swivel member with the first member extending radially outwardly therefrom and terminating at a free end, and a second member being of a solid elongated cylindrical rod having one end telescopically received in the free end of the first member and having the opposite end extending outwardly therefrom and being affixed to the disc member with the second member extending radially outwardly relative to said disc member, said disc member having a flat circular configuration with a flat top surface, a flat bottom surface, and a circular peripheral edge surface, the back surface of the disc member being affixed at its periphery to the adjacent terminal end of the second member of the telescopic support rod; and an even coating of pressure sensitive adhesive applied to the platform bottom surface for use in attaching said swivel base to the point of mounting on a conventional sun visor of a vehicle.

* * * * *